Nov. 10, 1964     H. P. MARDERNESS     3,156,253
PRESSURE REGULATING VALVE AND COMBINATION ON-OFF VALVE
Filed Nov. 24, 1961     2 Sheets-Sheet 1

INVENTOR.
HOWARD P. MARDERNESS
BY Carl Baker
ATTORNEY

United States Patent Office 3,156,253
Patented Nov. 10, 1964

3,156,253
PRESSURE REGULATING VALVE AND
COMBINATION ON-OFF VALVE
Howard P. Marderness, West Chester, Ohio, assignor to
General Electric Company, a corporation of New York
Filed Nov. 24, 1961, Ser. No. 154,548
4 Claims. (Cl. 137—220)

This invention relates generally to pressure regulating valves, both with and without on-off controls, and more particularly to such valves operative to maintain downstream pressure either at constant value or varying as a predetermined function of upstream pressure.

Pressure regulating valves of the general type to which the present invention relates are those in which fluid pressure downstream of the valve is compared against a reference pressure such as ambient, and in event of departure from the desired relationship between these pressures the pressure regulating valve is self-adjusting to bring the downstream pressure back to the desired level, to thus hold the downstream pressure at constant or regulated value. In conventional pressure regulating valve constructions, this balancing of pressures, and the movement of the pressure regulating valve necessary to correct any pressure discrepancy, is accomplished through servo mechanism including pressure sensor and servo pilot valve structures high in complexity and cost particularly in installations in which on-off control also is desired. The present invention has as its principal objective the provision of pressure regulating valves of this general type but characterized by substantial simplification of structure with consequent improvement in cost, reliability and maintainability, and characterized also by greater flexibility of application.

It is, therefore, a primary object of the invention to provide pressure regulating valve constructions, including on-off control if desired, characterized by simplicity of design affording good economy of manufacture and reliability in operation. It is also an object of the invention to provide pressure regulating valve constructions wherein the regulated pressure characteristic may be tailored to meet the requirements of any of many different applications.

In carrying out the invention in one presently preferred embodiment, there is provided a valve housing adapted to be connected into a fluid flow line the downstream pressure in which is to be regulated either to constant value or to some predetermined function of inlet or upstream pressure. The valve housing defines a valve cylinder having an open end facing downstream of the direction of fluid flow through the housing, and within this cylinder there is slidable the skirt element of a valve piston which includes also a valve head element cooperative with the housing to define a flow constriction the open area of which is reduced by upstream movement of the valve piston. The valve piston is subjected on one side to fluid pressure downstream of the flow constriction, i.e., to the pressure to be regulated, and on the other to the interior of the valve cylinder which may be connected to ambient or other reference pressure source. The valve piston is spring loaded in downstream direction, so that in operation the valve piston will move relative to the cylinder in a direction and to the extent necessary to adjust the open area of the flow constriction so as to maintain the pressure level downstream thereof just equal to the reference pressure plus the loading force of the valve spring. Since over a portion of its surface the valve piston is subjected to pressure upstream of the flow constriction, the pressure level to which regulated pressure downstream of the valve is held may be dependent also on inlet or upstream pressure, and may be made any desired function thereof by properly proportioning the effective areas of the valve piston skirt and head elements. Means may also be provided for damping the motion of the valve piston assembly as necessary to assure stable operation and desired response, and means may also be provided for valve shut-off to effect controlled on-off operation of the valve, if desired.

The invention will be further understood and its various objects, features and advantages more fully appreciated by reference to the appended claims and the following detaled description when read in conjunction with the accompanying drawings, wherein:

FIGURE 1 is a part sectional view of a pressure regulating valve in accordance with the present invention;

FIGURE 2 is a part sectional view of a second embodiment of the invention incorporating on-off control, shown in "off" position.

Figure 3:
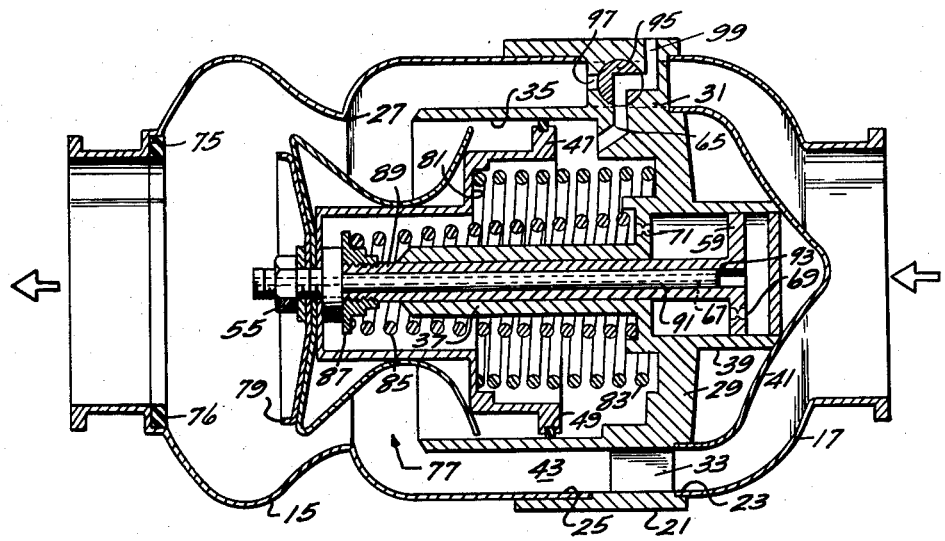
FIGURE 3 is a view similar to FIGURE 2 but showing the valve in "on" or pressure regulating operation.

With continued reference to the drawings, wherein like reference numerals have been used throughout to designate like elements, FIGURE 1 illustrates a pressure regulating valve designated generally by reference numeral 11. This valve 11 is connected in a fluid flow line 13 and is operative in the manner hereinafter explained to regulate the pressure in that line downstream of the valve 11 either to some constant pressure level or to a pressure level varying as some predetermined function of fluid pressure in the line 13 upstream of the valve. While the pressure regulating valve of this invention has particular utility in the control of gaseous fluids such as air, it is not limited in applicability to use with this medium and the term "fluid" as used herein accordingly should be understood as extending to liquids as well as to gaseous media.

The valve 11 comprises a generally tubular outer housing 15 including an inlet end member 17 and an outlet end member 19 joined together through an intermediate member 21 which is flanged as at 23 and 25 for interconnection to the inlet and outlet end members as shown. The outlet end member is inwardly convoluted as at 27 to define with the valve piston member to be described hereinafter, a variable area flow constriction the open area of which is adjusted for regulation of pressure level downstream of the valve.

The intermediate housing member 21 is in the form of a web having a central body portion 29 connected by a plurality of radial struts one of which is shown in section at 31 and one in elevation at 33, connecting the central body member with the outer flanges 23 and 25 to which the housing members 17 and 19 are attached. This web body 29 has formed integrally therewith a generally tubular member 35 defining a valve cylinder having one end open and facing downstream of the direction of fluid flow through the housing. This body member 29 may also have formed integrally therewith, as shown, a valve stem guide 37 and a damping piston cylinder 39 the purpose and operation of which will be explained hereinafter.

In the interests of minimizing resistance to fluid flow, a fairing member 41 of the generally conical configuration shown is attached to the upstream or inlet side of the intermediate housing member 29. This fairing member serves in cooperation with the housing inlet end member 17 to define a smoothly contoured transition section between thec onduit 13 and the annular flow passage 43 through the valve housing.

A regulating valve piston designated generally by reference numeral 45 includes a skirt element 47 slidably received within cylinder 35 and in sealing engagement therewith through a piston ring 49 of any suitable type. Piston 45 is urged in downstream direction by a loading spring 51 compressed between the valve piston and the web member 29, with this spring operating against a retainer element 53 which conveniently may form part of a lock nut assembly 55 serving also to fix the downstream end of piston 45 to a valve stem member 57 slidable within the guide 37. This valve stem and guide arrangement, operating in cooperation with the valve piston skirt 47, serves to maintain the valve piston properly aligned in its motion with respect to the valve cylinder, and the valve stem serves also to connect the valve piston to a damping piston 59 to be later described.

The regulating valve piston 45 is, as shown, axially elongated and includes an intermediate or neck portion 61 inwardly convoluted correspondingly to the inward convolution 27 of the housing member 15. At its downstream end the valve piston has an enlarged head element 63 of diameter at least equal to that of the outer housing member 15 at its inward convolution 27. With this arrangement, movement of the valve piston 45 in upstream direction will be operative to vary the open area of the flow orifice defined by the valve head element and the inward convolution 27 in housing member 15. In operation of the parts thus far described, the valve piston initially occupies a position to the left of that shown in FIGURE 1, with the valve piston urged to this downstream or full open position by the loading spring 51. As inlet pressure and flow through the valve increases, the valve will remain full open until the pressure level downstream thereof builds up to a point such that this pressure, acting on the left-ward facing head element 63 of valve piston 45 in opposition to the loading spring 51 and to the reference pressure within the valve cylinder, will cause the valve piston 45 to move in the upstream direction to reduce the open area of the flow constriction at 27, to thus modulate flow through the valve as necessary to hold the pressure downstream thereof constant at the design value.

This design value will be dependent in part upon the reference pressure within valve cylinder 35, which normally will be ambient or atmospheric pressure communicated into the valve cylinder chamber through a passage 65 which is formed in the housing web member 29 and leads outwardly through one of the struts 31. The design value of pressure is dependent also upon spring rate of the loading spring 51, since the fluid pressure load on the valve piston balances against the spring load at the control point.

It will be evident from FIGURE 1 that in normal operation of the pressure regulating valve the high pressure supply at the valve inlet will act in opposite directions on the valve skirt and on the valve head. If the valve skirt and head are made of equal effective diameters, the effects of variations in inlet pressure will cancel and the control point to which the valve regulates accordingly will under these conditions be substantially independent of inlet pressure. On the other hand, if the effective diameters of the valve skirt and head are made unequal, then the inlet pressure will give rise to a net force on the valve piston in one direction or the other. In this way, any desired variation of regulated pressure as a function of inlet pressure can be introduced. The design value of pressure held by the regulator also is dependent to some extent on design of the damping piston assembly for reasons next to be explained.

As previously noted, the damping assembly comprises a piston 59 reciprocable within a cylinder 39 and connected or formed integrally with the stem member 57 of the valve piston 45. A passage 67 formed centrally through this valve stem connects the right-hand end of damping cylinder 39 to a point in the air stream downstream of the valve orifice, with this connection being of sufficient flow capacity that fluid pressure to the right of damping piston 59 follows with no appreciable time lag the fluid pressure downstream of the regulating valve. A damping orifice 69 through piston 59 interconnects the two ends of damping cylinder 39, and the second orifice 71 connects the damping cylinder space to the left of damping piston 59 into the valve cylinder 35 as shown. At least one and preferably both of these orifices 69 and 71 is made sufficiently small to provide effective restraint on the damping piston 59 and, accordingly, on the valve piston 45 to which the damping piston is connected.

Since the pressure acting on the right-hand side of damping piston 59 is the same as that acting on the valve head 63 but acts in opposition thereto, it will be apparent that with this arrangement the control point or design value of pressure held by the regulator is to some extent influenced by the diameter of damping piston 59 relative to the diameter of the regulating valve piston 45. Thus, the design value of regulated pressure is dependent upon the relative areas of the valve head 63, the valve skirt 47, and the damping piston 59, as well as on the spring rate of loading spring 51. By proper selection of these design parameters, desired response may be obtained and stable operation assured by action of the damping mechanism.

The valve design of the present invention affords good flexibility of design and application in that practical spring stresses in small space, even for large valve sizes, can be obtained by proper selection of the diameter of the damping piston 59 relative to the diameter of the regulating valve piston 77. Since the downstream pressure communicated through bore 67 to the damping piston serves to counterbalance a portion of the fluid pressure derived force on the regulating valve piston, the net force on the piston assembly for any given pressure level downstream of the valve may be obtained by proper selection of the piston diameters. By thus utilizing the damping piston not only for damping purposes but also for pressure balancing, a lighter spring may be used even to balance against relatively high pressure differentials between downstream fluid pressure and ambient.

With reference next to FIGURE 2, a second embodiment of the invention is shown incorporating an on-off control selectively operable to completely close the regulating valve when no flow is desired and to open the valve to perform a pressure regulating function like that of the valve of FIGURE 1 during normal operation. The valve housing 15 in FIGURE 2 is similar to the valve housing of FIGURE 1 but adds thereto a valve seating surface 75 and seal element 76 adjacent the downstream end of the housing as shown, to accommodate the on-off valve.

The pressure regulating valve piston 77 differs from that of FIGURE 1 in including an annular valve seat 79 operable to engage the seal element 76 to prevent flow of fluid through the valve when the valve piston 77 is in its extreme downstream position as illustrated in FIGURE 2. The valve piston 77 further differs in having its inner surface stepped as at 81 to receive a compression spring 83 which is operative to maintain the valve piston against its seating surface 75 to thus maintain the on-off valve fully closed except when urged to open by fluid pressure differentials established in the manner to be explained hereinafter.

This spring 83 preferably is selected to provide a loading force relatively small as compared to that of the main loading spring 85, which corresponds in function to the spring 51 of FIGURE 1. In FIGURE 2, this main loading spring is compressed between the housing web member 21 and a spring retainer element 87 fixed to the left hand end of damping piston rod 89. Retainer element 87 and the piston rod 89 to which it is affixed have a lost motion connection to the valve piston 77 through a valve piston shaft 91 fixed at one end to the valve piston head and slidable within a bore 93 within the damping piston rod 89. The lost motion connection thus provided effectively disables the damping mechanism, as well as the main loading spring 85, when the device is to serve its on-off function rather than its pressure regulating function.

In operation of the on-off mechanism of the valve of FIGURE 3, the valve may be made to move to the closed position either by blocking the passage 65 to ambient, or by connecting this passage to inlet air pressure as by a two-way valve 95 connected as shown. Valve 95, which is a simple three-way cock valve, can be rotated to connect line 65 either to the inlet pressure through port 97, to ambient through port 99, or to block this line 65 completely. For pressure regulating operation the cock 95 is turned to connect line 65 to ambient, as illustrated in FIGURE 3. To close the pressure regulating valve, cock 95 may be turned to connect passage 65 to the inlet line as shown in FIGURE 2, in which case the combined force of the supply pressure acting on the left hand side of valve piston 77 and of the on-off spring 83 will move the valve piston to closed position.

This same result will ensue, though at slightly slower rate and with at least some measure of damping, if cock 95 is turned to block the passage 65 completely. When this occurs, outlet pressure bleeds through the damping piston rod bore and through damping orifices 69 and 71 into the space to the right of valve piston 77, eventually causing pressure in that space to build up substantially to outlet pressure. When this occurs, the spring 83 then forces the valve piston to the left to close off further flow of fluid into the outlet line. It will thus be apparent that by adjustment of the control valve 95 to block line 65 the pressure regulating valve may be made to move towards closed position at controlled velocity or, if faster action is necessary, this may be obtained without additional complexity of structure merely by adjusting the valve 95 to connect line 65 to supply or inlet pressure.

In switching "on," and assuming the valve to be initially closed with its parts occupying the position shown in FIGURE 2 but with valve 95 connecting line 65 to ambient through port 99, supply of pressure fluid through inlet 13 will cause the valve to open and to assume a position generally as illustrated in FIGURE 3. The valve opens in response to the differential pressure across the valve piston, which differential exists by reason of the difference in diameter of the valve piston skirt 47 and the valve seat 79. Because of this area difference, supply pressure within the valve housing exerts a net force on the valve piston in valve opening direction, asssuming of course that the pressure in the outlet line is not significantly lower than that within the valve cylinder 35. Since this latter space is normally vented to ambient and since the outlet line usually is likewise open to ambient or to a pressure level not below ambient, this requirement normally is met and, even if not, can be satisfied by properly proportioning the area of the piston valve skirt with respect to that of the seat 79.

As the valve piston assembly moves from its "off" position to a pressure regulating position, its valve piston assembly moves in upstream direction to bring the valve piston head into proximity to the inwardly convoluted portion of the outer casing to define therebetween a variable area orifice similar in function to that of FIGURE 1. Just prior to reaching this position, the valve piston head comes into contact with loading spring retainer element 89, and the main loading spring 85 then assumes control over the operating point of the valve, i.e., the pressure level to which the valve will regulate pressure downstream thereof. At the same time, the damping mechanism including damping piston 59 comes into play to control the rate of movement of the valve piston assembly in its regulating operation to stabilize the system.

While only certain preferred embodiments of the invention have been described and illustrated by way of example in the foregoing, many modifications will occur to those skilled in the art and it therefore should be understood that the appended claims are intended to cover all such modifications as fall within the true spirit and scope of the invention.

What is claimed as new and desired to be secured by Letters Patent of the United States is:

1. A fluid pressure regulating valve comprising:
    a valve housing adapted to be connected in a fluid flow line and including wall means defining a valve cylinder member, a surrounding annular passage, and an inward convolution in said passage downstream of the cylinder member;
    a valve piston member including a skirt element slidable in said cylinder member and a head element disposed downstream of said inward convolution in said housing wall means to define therewith a flow constriction the open area of which is reduced by upstream movement of the valve piston member;
    force loading means for said valve piston member including passage means connecting said cylinder member to a first reference pressure source at pressure level related to the level of pressure to be held by the regulating valve by the same proportionality as between the effective areas of said valve piston skirt and head elements on which these pressures respectively act;
    on-off valve means including relatively movable valve and valve seat elements, one carried by said housing wall means and one by said valve piston member, said on-off valve elements being of effective area smaller than said valve piston skirt and arranged to block fluid flow through said housing upon travel of said valve piston member to its downstream extreme of movement;
    a second reference pressure source at pressure level substantially higher than said first source; and
    valve means operable to maintain a first position to maintain said passage means connected to said first reference pressure source so that said valve piston member will move to control the open area of said flow constriction in response to the regulated pressure acting on said valve piston head element and to said first reference pressure acting on said valve piston skirt element, and operable in a second position to transfer said connection to said second reference pressure source to cause said valve piston member to move to close said on-off valve means.

2. A fluid pressure regulating valve as defined in claim 1, wherein said selectively operable valve means upon interrupting said passage means connection to said first reference pressure source operates to connect said passage means into said fluid flow line upstream of said flow constriction.

3. A fluid pressure regulating valve as defined in claim 1, including damping means for said valve piston member comprising relatively movable damping piston and cylinder elements each fixed to one of said valve piston and cylinder members, and means for communicating fluid pressure downstream of said flow constriction to an end of said damping cylinder such that the pressure derived force on the damping piston is in opposition to that on the valve piston member and partially counterbalances the same.

4. A fluid pressure regulating valve as defined in claim 3 including orifice means connecting said one end of said damping cylinder into said valve cylinder member, and wherein said selectively operable valve means blocks said passage means thereby causing said valve piston member to move to close said on-off valve means under control of said orifice means.

References Cited in the file of this patent

UNITED STATES PATENTS

| | | |
|---|---|---|
| 2,053,611 | Hill | Sept. 8, 1936 |
| 2,590,622 | Huber | Mar. 25, 1952 |
| 2,702,048 | Coffey | Feb. 15, 1955 |
| 2,707,966 | Taplin | May 10, 1955 |
| 2,746,471 | Cobb | May 22, 1956 |
| 2,805,680 | Longbottom | Sept. 10, 1957 |
| 2,884,003 | Jensen | Apr. 28, 1959 |
| 2,989,067 | Perle | June 20, 1961 |

FOREIGN PATENTS

| | | |
|---|---|---|
| 410,505 | France | Mar. 15, 1910 |

OTHER REFERENCES

Sidorov (Russian patent Description for Author's Certificate), 121,292; approved for Printing Sept. 24, 1959; abstract published in Bulletin of Inventions No. 14 for 1959.